United States Patent [19]

Kilim

[11] Patent Number: 4,888,252
[45] Date of Patent: Dec. 19, 1989

[54] MOULD SETS FOR PLASTICS MOULDING MACHINES

[76] Inventor: Rafael Kilim, 150 Coles Green Road, London NW2 7JL, England

[21] Appl. No.: 289,435

[22] Filed: Dec. 22, 1988

[30] Foreign Application Priority Data

Aug. 6, 1986 [GB] United Kingdom ............... 8619177

[51] Int. Cl.4 .................. B29C 33/00; B21C 23/14
[52] U.S. Cl. .................................. 428/582; 72/254; 249/80; 249/135; 249/160; 425/190; 425/195; 428/577
[58] Field of Search ............... 249/79, 80, 135, 160, 249/167; 425/190, 195, 547, 552, 556, 595, 444, 451.9, DIG. 221; 428/577, 582; 72/253.1, 254

[56] References Cited

U.S. PATENT DOCUMENTS

| 2,531,965 | 11/1950 | Beck et al. | 249/205 |
|---|---|---|---|
| 2,987,772 | 6/1961 | Beatty, Jr. | 249/80 |
| 3,159,697 | 12/1964 | Tocci . | |
| 3,356,131 | 12/1967 | Smith | 249/80 |
| 3,556,460 | 1/1971 | Premo | 249/80 |
| 4,269,586 | 5/1981 | Ronayne | 249/79 |
| 4,295,628 | 10/1981 | Kupf et al. | 249/80 |
| 4,372,524 | 2/1983 | Pailler | 249/79 |
| 4,573,900 | 3/1986 | Smith | 425/556 |
| 4,661,055 | 4/1987 | Thivichon-Prince et al. | 425/556 |
| 4,687,045 | 8/1987 | Roller | 249/135 |
| 4,710,124 | 12/1987 | Harrison | 425/556 |

FOREIGN PATENT DOCUMENTS

| 2132896 | 6/1971 | Fed. Rep. of Germany . | |
| 2564773 | 11/1985 | France . | |
| 55-011831 | 1/1980 | Japan . | |
| 55-11831 | 1/1980 | Japan . | |
| 58-72425 | 4/1983 | Japan | 249/80 |
| 944616 | 12/1963 | United Kingdom . | |
| 1461744 | 1/1977 | United Kingdom . | |
| 1535461 | 12/1978 | United Kingdom . | |

OTHER PUBLICATIONS

Grant, Julius, ed., *Hackh's Chemical Dictionary*, McGraw-Hill Book Co., NY, NY, 4th ed., p. 226, (1969).
Frados, Joel, ed., *Plastics Engineering Handbook*, Van Nostrand Reinhold Co., NY, NY, 4th ed., pp. 347, 635,637, (1976).
Aluminum Mould-Set Company Ltd. sales brochure, "Ready-Made Aluminum Mould Bases for Prototypes, and Short-Run Plastic Injection Mouldings".

Primary Examiner—James C. Housel
Attorney, Agent, or Firm—Leydig Voit & Mayer

[57] ABSTRACT

A mould set for injection moulding of plastics material comprises two one-piece components which together define the mould cavity and which are each produced by extrusion of high duty aluminum alloy so as to comprise, also, and integrally with each of them, all the necessary fixtures and fittings for the mould set. In addition, one of the mould components is provided with integrally extruded flanges enabling an ejector plate (also extruded from high duty aluminum alloy) to be supported without the need for complex fixtures. There is thus provided a mould set which performs the same functions as a conventional set even though the latter has three times as many components.

8 Claims, 2 Drawing Sheets

MOULD SETS FOR PLASTICS MOULDING MACHINES

This application is a continuation of application Ser. No. 07/080,322 filed July 31, 1987, now abandoned.

BACKGROUND OF THE INVENTION

1. Field of the Invention

This invention relates to mould sets for use in plastics moulding machines including blow moulding machines and moulding machines which are intended for prototype or other short run purposes. Mould sets are also known as mould bases.

2. Summary of the Prior Art

Plastics injection moulding machines have been known for many years and designs of such machines are available some of which are particularly suited to short run (i.e. less than of the order of 100,000 articles) or prototype manufacture. Hitherto, the mould sets for all types of injection moulding machines have been made mainly of high quality tool steel which is not only a costly material but requires expensive machining operations in order to achieve the required longevity in use. Such mould sets are acceptable from a cost standpoint for long production runs of plastics articles which may reach very large figures. However, when the mould set is only required for comparatively short runs, sometimes very short indeed where prototypes are involved, the cost of the mould sets becomes an unacceptably high proportion of the cost of production of the prototype articles. Such steel mould sets are often built up from individual parts of high quality steel requiring the use of securing means and an assembly operation which may take an appreciable length of time. A typical mould set may incorporate as much as twelve or more main parts, that is excluding guide pins, securing means and so on.

Aluminum tools have been used for short-runs and prototypes at lower cost than steel, but as the design of the tool set is the same as traditional tool sets, such aluminum tools give rise to the following disadvantages:

1. Because the individual plates have to be cut out from large plates and machined to size there is a high wastage of material.

2. The overall design of such aluminum mould sets incorporates more plates to achieve the required standard tool shape, thus again consuming more aluminum.

3. Every mould set needs many similar operations in order to incorporate features of the basic tool, for example, clamping arrangements, cooling channels, raising blocks and so on. This is time-consuming and has to be repeated for every tool.

It is therefore an object of the present invention substantially to reduce the overall cost of tools sets, more especially those intended for prototype and other short duration production runs.

SUMMARY OF THE INVENTION

According to the present invention there is provided a method of making a main, constant cross-section, component of a mould set comprising the steps of extruding a high-duty aluminum alloy to form an extruded section of predetermined shape, cutting the section to form a blank of required length and finishing the blank to render the component ready for assembly to one or more other such components to form a mould set.

Further according to the present invention there is provided a mould set for use in a plastics moulding machine comprising at least one individual main component of constant, predetermined, cross-section of extruded, high duty, aluminum alloy.

By manufacturing the main components of a high duty aluminum alloy the amount of machining eventually required is small because features of the components which are conventionally machined can readily be incorporated in the section as extruded, and it is of course readily possible to provide subsequently to extrusion the bores and passages through the components which are transverse to the direction of extrusion of the component. The final finish can be effected by spark erosion techniques or other conventional machining. If desired water cooling holes extending in the direction of the extrusion motion may be provided during the extrusion process.

As will be understood by those skilled in the art any main component of a mould set can be produced such as a cavity plate or an ejection plate and sliders.

The invention is also applicable to mould set components for blow moulding machines.

BRIEF DESCRIPTION OF THE DRAWINGS

Typical main components which can be produced in accordance with the invention will now be described, by way of example only, with reference to the accompanying diagrammatic drawings, in which.

DESCRIPTION OF THE PREFERRED EMBODIMENT

The term "high duty aluminum alloy" is well known to the man skilled in the extrusion art and will not be further described.

The accompanying drawings illustrate particular examples of components which can be manufactured by the method in accordance with the invention but it must be emphasized that those illustrated are only typical examples and any main component of constant cross-section of a mould tool set can be equally readily produced.

Figure 1:
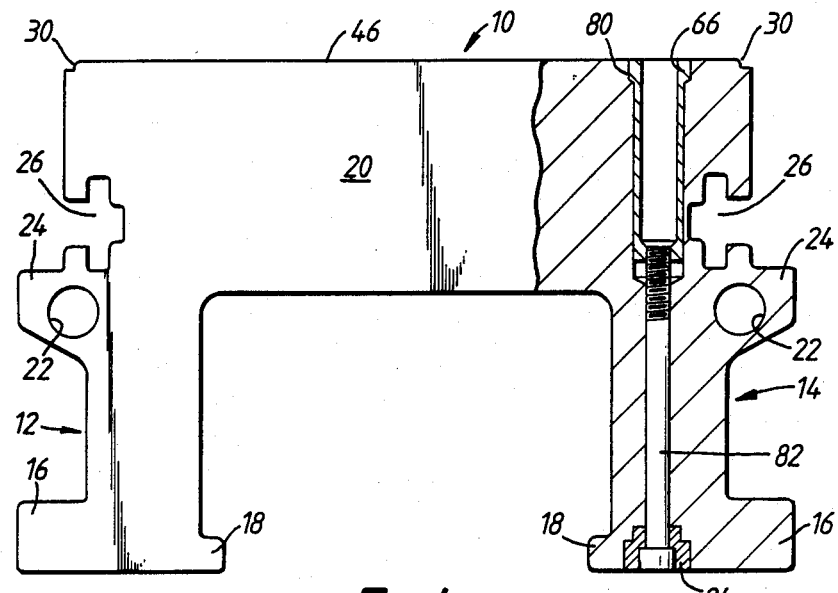
FIG. 1 is an end elevation, partly in cross-section, of one component of a mould set made from extruded high duty aluminum alloy.

A bottom plate 10 illustrated in FIG. 1 is, in very broad terms of inverted channel section and the downwardly directed limbs 12, 14 of the channel each have a mirror-symmetric arrangement of continuous flanges 16, 18, the ones directed towards the inside of the channel being appreciably smaller than those directed outwardly of the channel. The flanges 16 will be used by clamps to hold the mould set in a moulding machine. The flanges 18 serve to back the ejector plate.

Each limb 12, 14 acts as a riser joining the transverse portion 20 of the channel section member with a radius and outwardly, considering the channel section member as a whole, of these radiused portions a water-passage 22 is provided which, when assembled, will serve a cooling purpose. Each water-passage 22 is accommodated within a projection 24 the outermost surface of which is aligned with the outermost surface of the lower, outer, flange 16 of the corresponding limb 12 or 14. It will be readily apparent from the Figure that the extruded section is generally mirror-symmetric about the vertical centre line and the parts have been described on this basis. In the main body or transverse portion 20 of the channel section member cruciform grooves 26 are provided which in the assembled condition, provide a clamping facility for a side core on each side of the top plate.

The upper surface of the main or transverse portion 20 of the channel section member has at each longitudinal edge a slight recess 30 of approximately rectangular cross-section. As will be apparent from FIG. 1 the limbs 12, 14 have a depth approximately equal to the depth of the main or transverse-member.

Figure 2:
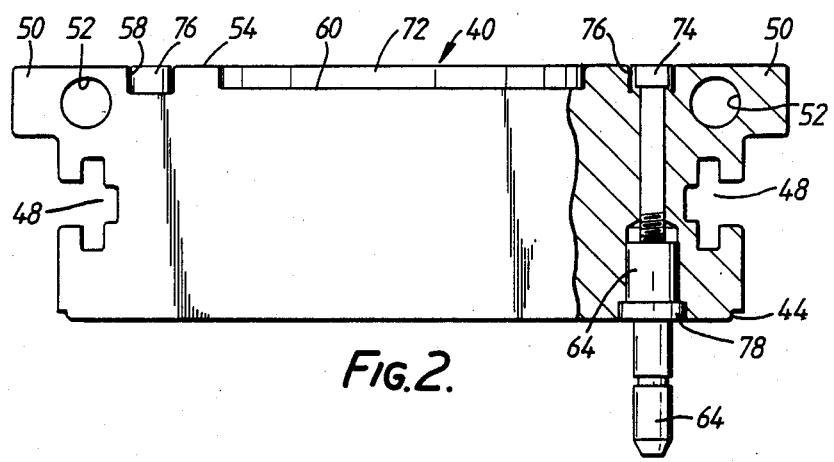
FIG. 2 is an end elevation, partly in cross-section, of a second main component of a mould set made of high duty aluminum alloy.
Figure 3:
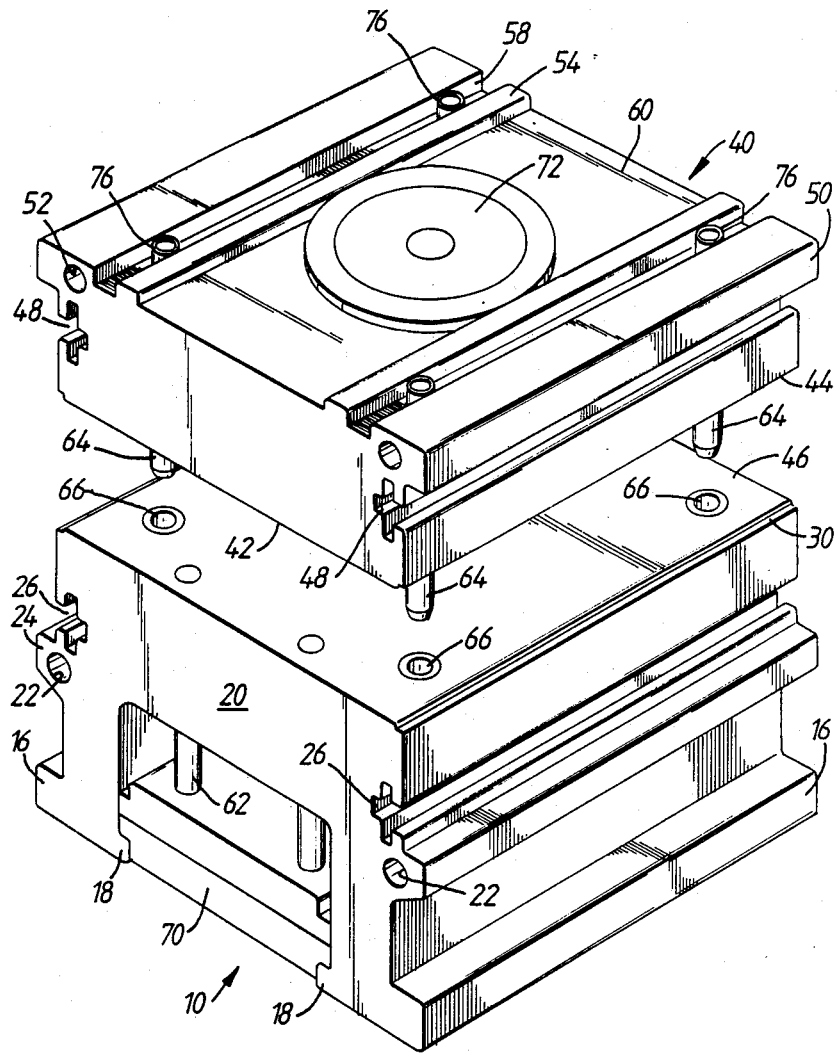
FIG. 3 is an exploded perspective assembly view showing the components of FIGS. 1 and 2 in their fully machined condition and ready for incorporation in an injection moulding machine.

Turning now to FIG. 2, a cavity plate 40 which can be manufactured in accordance with the method of the present invention is generally of rectangular section and has a plane base surface 42 which, when assembled, engages against the upper surface of the top plate 10 as indicated in FIG. 3. Longitudinally extending recesses 44 match the corresponding recesses 30 of the upper-surface 46 of the bottom plate.

Like the bottom plate, the cavity plate 40 has opposed cruciform section grooves 48 to provide clamping arrangements for side cores. Opposed flanges 50 at their upper surfaces form continuations of an upper surface 54 of the cavity plate and water cooling passages 52 are provided immediately adjacent but inwardly of the upper flanges of the plate. Inwardly of each of the water cooling passages a channel 58 is provided and a further shallow, but much wider channel 60 is provided which is symmetric about the centre line.

Both the bottom plate 10 and the cavity plate 40 are extruded members of high duty aluminum alloy, each being formed by extrusion, cutting off appropriate lengths followed by finish machining. Any required bores are also machined and the main components are then assembled together. As is apparent many of the operationally required features of the completed mould base are provided by the extrusion method, for example flanges 16,18 required for fixing and grooves for receiving side cores.

FIG. 3 illustrates the bottom plate 10 and the cavity plate 40 substantially in assembled condition with conventional return pins 62, guide pins 64 and bushes 66 receiving the guide pins. The longitudinal recess 60 has a sprue bush 72 inserted in its surface.

The guide pins 64 and guide bushes 66 are generally conventional but an example of the construction by which these parts are incorporated is illustrated in FIGS. 1 and 2. A screw 74 passes through a bush 76 received in the channel 58 and serves to hold the corresponding guide pin 64 in its correct location. The guide pin is provided with an annular flange 78 engaged in a complementary annular seating of the bore receiving the guide pin and by fully tightening the screw 74 the guide pin is rigidly held to the cavity plate.

The bush 66 receiving the protruding part of the guide pin 64 again has a flange 80 engaged in a seating and the bush is tightly retained by a screw 82 extending through a narrower continuation of the bore which accommodates the bush 66. The lower, head, end of the screw engages in a bush 84. For accuracy of alignment of the bottom plate and the cavity plate all the guide pins and bushes must be absolutely rigid with the corresponding plate.

The return pins 62 are guided in bushes (not shown) received in the transverse portion 20 of the channel section. The manner of operation of the mould set will be conventional and accessories can be employed as required. In FIG. 3 an ejector plate 70 is received in the recess formed below the transverse portion 20 of the bottom plate. The ejector plate will also be of an extruded high duty aluminum alloy.

All the main components hereinbefore described are made of a high duty alloy with the Alcan designation HD87 which is part of the 7000 series. There are other suitable alloys in the 7000 series and also in the 2000 series. All have to be heat-treated and stretched and all have good machinability.

| Material Designation BS 1474 | Chemical Composition | | | | | | | | |
|---|---|---|---|---|---|---|---|---|---|
| | Si | Fe | Cu | Mn | Mg | Cr | Ni | Zn | Ti |
| Alloys in the 2000 series have compositions as follows: | | | | | | | | | |
| 2011 BS4300/5 | 0.40 | 0.7 | 5.0–6.0 | — | — | — | — | 0.30 | Bi 0.20–0.6 Pb 0.20–0.6 | — |
| 2014A | 0.50–0.50 | 0.50 | 3.9 | 0.40 | 0.20 | 0.10 | 0.10 | 0.25 | Zr + Ti 0.20 | 0.15 |
| Alloys in the 7000 series have composition as follows: | | | | | | | | | |
| 7020 BS4300/15 | 0.35 | 0.40 | 0.20 | 0.05 0.50 | 1.0 1.4 | 0.10 0.35 | — | 4.0 5.0 | Zr 0.08–0.20 Zr + Ti 0.08–0.25 | — |

The typical components illustrated will cost approximately one half of directly equivalent components of tool steel. The number of main parts, that is excluding screws, bushes, and accessories is reduced to three.

What is claimed is:

1. A mould-set for use in producing a mould for injection moulding of plastics material, consisting essentially of:

a one piece cavity plate generally rectangular in cross-section and defining a generally planar working surface and made of high duty aluminum alloy which is extruded, cut off to length and subsequently finish-machined only, the cavity plate defining longitudinally extending external surface formations produced by the extrusion for clamping the cavity plate in position in use, a one piece bottom plate having a main part of generally rectangular cross-section defining a generally planar working surface, the bottom plate being made of high duty aluminum alloy which is extruded, cut off to length and subsequently finish-machined only, the bottom plate defining longitudinally extending external surface formations produced by the extrusion for clamping the bottom plate in position and for supporting an ejector plate in use, the cavity plate and the bottom plate being assembled together, with their working surfaces facing and parallel to each other such that a mould cavity may be machined in at least one said working surface to form a mould to a desired shape, locating pins projecting from one of the working surfaces and engaging recesses in the other working surface so as positively to locate the two plates in relation to each other, an ejector plate supported by the formations on the bottom plate on a side thereof opposite to the working surface, the ejector plate being made of high duty aluminum alloy which is extruded, cut off to length and subsequently finish-machined only, the ejector plate carrying ejector pins projecting into bores in the rectangular cross-section main part of the bottom plate, the ejector plate being movable towards the main part of the bottom plate such that the ejector pins slide within said bores and eject a moulded part in the mould cavity when machined in the said at least one working surface.

2. A mould-set as claimed in claim 1, wherein at least one of the cavity and bottom plates has water passages extending longitudinally therethrough which are formed by extrusion.

3. A mould-set as claimed in claim 1, wherein each of the bottom plate and cavity plate has a pair of longitudinal grooves of cruciform section which provide clamping arrangements for side cores which are formed by extrusion.

4. A mould-set as claimed in claim 1, comprising a sprue bush, the cavity plate being provided with a central elongate channel on a side opposite said working surface into which the sprue bush opens.

5. A mould-set as claimed in claim 1, wherein the formations on the bottom plate include, on the opposite side of the said bottom plate to the generally plane working surface, integral parallel limbs carrying flanges directed towards each other, the ejector plate being supported on these flanges.

6. A mould-set as claimed in claim 5, in which the said external surface formations of the bottom plate further include parallel formations on said limbs.

7. A mould-set as claimed in claim 5, in which the external surface formations further include parallel flanges carried by the parallel limbs and directed away from each other.

8. A mould-set as claimed in claim 1, in which the external surface formations of the cavity plate are external shoulders thereon extending parallel to and away from each other.

* * * * *

UNITED STATES PATENT AND TRADEMARK OFFICE
CERTIFICATE OF CORRECTION

PATENT NO. : 4,888,252

DATED : December 19, 1989

INVENTOR(S) : Rafael Kilim

It is certified that error appears in the above-identified patent and that said Letters Patent is hereby corrected as shown below:

Please insert on the face of the patent:

[63] Continuation of Ser. No. 80,322, July 31, 1987, abandoned

Signed and Sealed this

Fifth Day of March, 1991

Attest:

Attesting Officer

HARRY F. MANBECK, JR.

Commissioner of Patents and Trademarks